(12) United States Patent
Zhang

(10) Patent No.: US 9,622,136 B2
(45) Date of Patent: Apr. 11, 2017

(54) METHODS, COMPUTER PROGRAM PRODUCTS AND APPARATUSES ENABLING TO IMPROVE HANDOVERS IN MOBILE COMMUNICATION NETWORKS

(75) Inventor: Heng Zhang, Beijing (CN)

(73) Assignee: Nokia Solutions and Networks Oy, Espoo (FI)

(*) Notice: Subject to any disclaimer, the term of this patent is extended or adjusted under 35 U.S.C. 154(b) by 75 days.

(21) Appl. No.: 14/407,153

(22) PCT Filed: Jun. 15, 2012

(86) PCT No.: PCT/CN2012/077045
§ 371 (c)(1),
(2), (4) Date: Dec. 11, 2014

(87) PCT Pub. No.: WO2013/185354
PCT Pub. Date: Dec. 19, 2013

(65) Prior Publication Data
US 2015/0181494 A1    Jun. 25, 2015

(51) Int. Cl.
*H04W 4/00*     (2009.01)
*H04W 36/24*    (2009.01)
(Continued)

(52) U.S. Cl.
CPC ......... *H04W 36/245* (2013.01); *H04W 24/02* (2013.01); *H04W 36/0083* (2013.01)

(58) Field of Classification Search
CPC ...... H04W 36/14; H04W 36/22; H04W 36/30
See application file for complete search history.

(56) References Cited

U.S. PATENT DOCUMENTS

| 2006/0227744 | A1 | 10/2006 | Metke et al. | ................. 370/331 |
| 2009/0029677 | A1* | 1/2009 | Choi | ..................... H04W 12/06 455/411 |
| 2009/0291689 | A1* | 11/2009 | Negishi | ................. H04W 36/32 455/436 |

FOREIGN PATENT DOCUMENTS

| CN | 101151913 A | 3/2008 |
| CN | 101365242 A | 2/2009 |

OTHER PUBLICATIONS

3GPP TS 32.521 V11.1.0 (Dec. 2012); "3$^{rd}$ Generation Partnership Project; Technical Specification Group Services and System Aspects; Telecommunication Management; Self-Organizing Networks (SON) Policy Network Resource Model (NRM) Integration Reference Point (IRP); Requirements (Release 11)"; Dec. 2012; whole document (26 pages).

(Continued)

*Primary Examiner* — Chi H Pham
*Assistant Examiner* — Fahmida Chowdhury
(74) *Attorney, Agent, or Firm* — Harrington & Smith

(57) ABSTRACT

A memory includes a number of partitions, each assigned to a respective terminal, each including a first number of subpartitions of a first type, each assigned to a respective cell visited by the respective terminal. The memory includes second number of subpartitions of a second type, each assigned to a respective transition of a terminal between respective cells. Upon each transition of a respective terminal between respective cells, data is received pertaining to the respective terminal from a network entity(ies) representing a respective cell. Responsive thereto, in each subpartition of the first type, statistical information is stored that pertains to the terminal in relation to that cell. In each subpartition of the second type, information is stored that pertains to the respective transition of the terminal. It (Continued)

Apparatuses as well as respective related methods, and computer program products are disclosed.

20 Claims, 6 Drawing Sheets

(51) Int. Cl.
*H04W 24/02* (2009.01)
*H04W 36/00* (2009.01)

(56) References Cited

OTHER PUBLICATIONS

3GPP TS 32.522 V11.7.0 (Sep. 2013); "3$^{rd}$ Generation Partnership Project; Technical Specification Group Services and System Aspects; Telecommunication Management; Self-Organizing Networks (SON) Policy Network Resource Model (NRM) Integration Reference Point (IRP); Information Service (IS) (Release 11)"; Sep. 2013; whole document (58 pages).
3GPP TR 36.902 V9.3.0 (Dec. 2010); "3$^{rd}$ Generation Partnership Project; Technical Specification Group Radio Access Network; Evolved Universal Terrestrial Radio Access Network (E-UTRAN); Self-configuring and self-optimizing network (SON) use cases and solutions (Release 9)"; Dec. 2010; whole document (21 pages).

* cited by examiner

METHODS, COMPUTER PROGRAM PRODUCTS AND APPARATUSES ENABLING TO IMPROVE HANDOVERS IN MOBILE COMMUNICATION NETWORKS

FIELD OF THE INVENTION

The present invention relates to methods, computer program products and apparatuses enabling to improve handovers in mobile communication networks. In particular, the proposed methods, computer program products and apparatuses are applicable and pertain to self-organizing networks, SON.

BACKGROUND

Mobile data transmission and data services are constantly making progress. With the increasing usage of mobile communication, network organization and optimization is becoming more and more important. Also, in this context self organizing networks (SON) are being investigated, e.g. in the framework of LTE™ or LTE™-A.

Insofar, the present invention relates in particular but without limitation to mobile communications, for example to environments under WCDMA, LTE™ (Long Term Evolution) or LTE™-A (LTE™ Advanced), UMTS (Universal Mobile Telecommunication System), 3GPP ($3^{rd}$ Generation Partnership Project) or any other communication scenario, potentially standardized by ETSI (European Telecommunication Standards Institute) and/or other local or regional standardization bodies e.g. NGMN (Next Generation Mobile Networks), and can advantageously be implemented as or in chipsets, or modules, or units, or apparatuses of devices (e.g. network entities such as a transceiver device also known as base station, or NodeB, or evolved NodeB eNB, or e.g. a mobility management entity MME) forming part of those networks.

More particularly, the present invention relates to those apparatuses/units of devices or network entities that are applied in such communication networks for the purposes of self organization and network optimization of those networks, e.g. known as SON networks.

With the evolution of LTE™ system, future cellular networks will become more and more complex, various and huge. For network operators, along with the uses of new technologies, how to reduce network infrastructure costs and operating expenses is a big challenge. So NGMN (Next Generation Mobile Networks) and 3GPP proposed the Self-Organizing Network (SON) technology, and standardized it in at least the LTE™ system.

Self-configuring and Self-optimizing are two main parts of LTE™ SON, wherein the related use cases and solutions are defined e.g. in 3GPP LTE™ TR 36.902 Release 9 (TR=Technical Report).

Self-configuring focuses on automatically installing software (such as control code portions), on configuring wireless parameters and (other) transmission parameters, and on detecting and finding neighbors (neighbor cells) and on managing relations when such system is being constructed or being setup.

Self-optimizing focuses on an adaptive adjustment of parameters according to measurement results from network devices and/or terminals within the network when the system is running or in operation. The adjustment should be within the scope defined by operators, thereby achieving the network performance optimization purposes.

For example, 3GPP in 2009 determined the objectives of SON in LTE Release 9, and then gradually completed related programs and standards on Mobility Robustness Optimization (MRO), dynamic load balancing optimization, and Random Access Channel (RACH) optimization.

Robustness in mobility requires sound handover decisions for a terminal (e.g. user equipment UE or other wireless terminal such as a smartphone or laptop) moving in a wireless, e.g. typically cellular, network environment.

A complete handover (HO) procedure can typically be divided into five parts: Measurement Control, Measurements Report, Handover Preparation, Handover Decision, and Handover Completion.

In mobile network, handover (HO) prediction and decision is a necessary, important and complex part, and if HO parameters are set right or not, this will directly impact not only a user's experience but also system performance. In 2G/3G ($2^{nd}$ Generation/$3^{rd}$ Generation) systems, manual setting of HO parameters is a time consuming task which does not achieve a too high robustness, thus a rather low robust way.

So, in e.g. 3GPP LTE™ TR 36.902 R9, Mobility Robustness Optimization (MRO) is defined to resolve the issue through self-configuring and self-optimizing method.

Currently, most of solutions on HO parameters optimization are cell-level based. For example, a network transceiver device such as an evolved NodeB (eNB) optimizes parameters known as "time to trigger", TTT, hysteresis, hys, according to some algorithms and HO results, and the optimized parameters are applied for all users in the cell.

Because of the differences of users' mobility characteristics, those shared or cell-wide applied HO parameter are not so precise for each user, thus resulting in a reduced service quality for some users e.g. due to HO failure.

Along with the increase of cells and more and more complexity of wireless environments, the cell-level based HO parameters optimization will become powerless, and will cause some unnecessary HOs and occurrences of too late/too early HOs, Some papers focus on studying user-level based HO optimization. Those can be divided to two categories: user HO history based method and user location based method. These algorithms just provide some ways on how to identify a user's (past or current) route/mobility pattern.

There are also some MRO algorithms dealing with HO parameter optimization, but those are merely targeted to cell-level solutions.

Thus, there is still a need to further improve such systems.

SUMMARY

Various aspects of examples of the invention are set out in the claims.

According to aspects of the present invention, there is provided apparatuses and methods as set forth in the independent claims.

Advantageous further developments are as set out in respective dependent claims in relation to each of the above aspects.

According to a further aspect of the present invention, there are provided computer program products, as set out in the claims, comprising computer-executable components which, when the program is run on a computer, are configured to implement and/or carry out the above method aspects. Those computer program product/products may be embodied as a computer-readable storage medium.

Thus, improvement is based on methods, apparatuses and computer program products according to at least one or more embodiments covered by the above aspects.

For Example:

At least some aspects of the invention relate to SON and in particular to an MRO implementation, and are effective to increase system performance by reducing unwanted handovers.

Reducing unwanted or even unnecessary handovers likewise improves a user's experience.

According to at least some aspects, it is implemented to take into account user mobility patterns. E.g. by analyzing a user environment (environment is to be understood in the broadest sense in terms of parameters descriptive of conditions prevailing for a mobile user when roaming in a network) over time (e.g. the user history), appropriate MRO parameters that can be used to begin a handover procedure are configured and/or adapted, so that handovers are reduced for users. In effect, it is presented, according to an aspect at least, an algorithm that analyzes the user's mobile route and that then adapts mobility parameters on a per user basis based on that user's mobile/mobility route. Analysis of user mobility route is based on data stored in some user mobility database.

The algorithm presented herein, i.e. the so-called UMAA-MRO algorithm, through analyzing user mobility data and some other factors, provides a precise way to find and configure appropriate handover parameters for UE on user route level, which can significantly reduce handover failures and avoid unnecessary handovers, thereby improving system performance and user's experience. It provides an assistive function to handover in self-optimization OAM systems, with all adjusted parameters being maintained in the respective ranges defined by operators and related standards.

The concepts as presented in line with aspects of the invention are applicable for an eNodeB or MME, for example.

More particularly, the concepts as presented in line with aspects of the invention will also be applicable to e.g. 3GPP LTE™ TR 36.902 version 9.3.1 Release 9 LTE™; Evolved Universal Terrestrial Radio Access Network (E-UTRAN); Self-configuring and self-optimizing network (SON) use cases and solutions, and lead to an updated version thereof.

Thus, with aspects of the present invention being implemented to e.g. SON networks, there are special parameters applied individually for each user to optimize HO scenarios and network performance. Namely, since most people do the same/similar things in the same period time of most days, their mobility routes or patterns are almost same in the days. Hence, according to an aspect of the invention, these routes/patterns and/or other similarities are identified, and based thereon, setting of appropriate HO parameters for the respective (individual) user can be accomplished, thus solving the issues above, and improving user's experience as well as system performance.

Aspects of the invention propose to set and update HO parameters for each user based on a user's mobility/location being tracked and/or its mobility history as e.g. expressed by a record of past handovers, and to combine those parts.

Aspects of the present invention relate mainly to MRO improvements, basing on user mobility and mobile environment to optimize handover (HO) parameters to enhance user HO success rate and reduce unnecessary HOs.

Aspects of the invention consider, among others, the parts measurement control, measurements report, handover preparation insofar as a source eNodeB configures UE measurement procedures, and UE triggers measurement reports according to the configured parameters, and then the source eNodeB makes HO Decision based on the Measurement Report and the Radio Resource Management (RRM).

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Examples of aspects of the invention will be described herein below.

In various standards, different names may apply for those entities. Therefore, as a mere example only that was chosen to describe a possible implementation framework of the present invention, reference is made to LTE™ SON and related documents. Abbreviations and definitions as set out in such documents/context shall also apply for the purpose of describing at least concepts/embodiments of this invention, though those are not intended to limit the applicability of those concepts/embodiments to other telecommunication environments.

In brief, according to at least an aspect of the invention, a new MRO algorithm named herein UMAA-MRO (User Mobility Analysis Assistive MRO) is proposed, in which a User Mobility Database (UMD) and corresponding function module, i.e. control unit, are setup (e.g. in an eNB or a mobility management entity MME of the network) to analyze user mobility (e.g. current and past mobility) and (network) environment including route, time period, frequency, speed, weather, habit, etc, and help eNodeBs to select adaptive Time to Trigger (TTT), Hysteresis (Hys), Cell Individual Offset (CIO), Cell Reselection Parameters (CRs) for the User Equipment (UE) in user-level, i.e. individually per terminal such as a UE. The handover results for the UE will be recorded (from source/target eNB) in the database as the data for analyzing and selecting next time HO parameters in the same conditions.

In the UMD, for each user, use is made of e.g. a directed graph to store cells (aka "vertices"), HOs as transitions from cell to cell (aka "edges"), and parameters (attributes) info. For vertices, there are added statistic information of visits frequency and time periods; for edges, there are used HO frequency as weight and HO parameters as other attributes. The values of attributes are adaptive, and are kept updated according to HO results.

The new function module/control unit is a logical module which can be located in eNodeB or MME, or even other network elements. It mainly includes two parts: 1) update functionality for updating the graph according to HO results; 2) retrieval functionality for searching and returning optimum parameters values to source eNodeB (SeNB, denoting a source (origin) eNB from which a HO is effected to a target eNB, TeNB, as a destination of the terminal's mobile way through the network).

Figure 4:
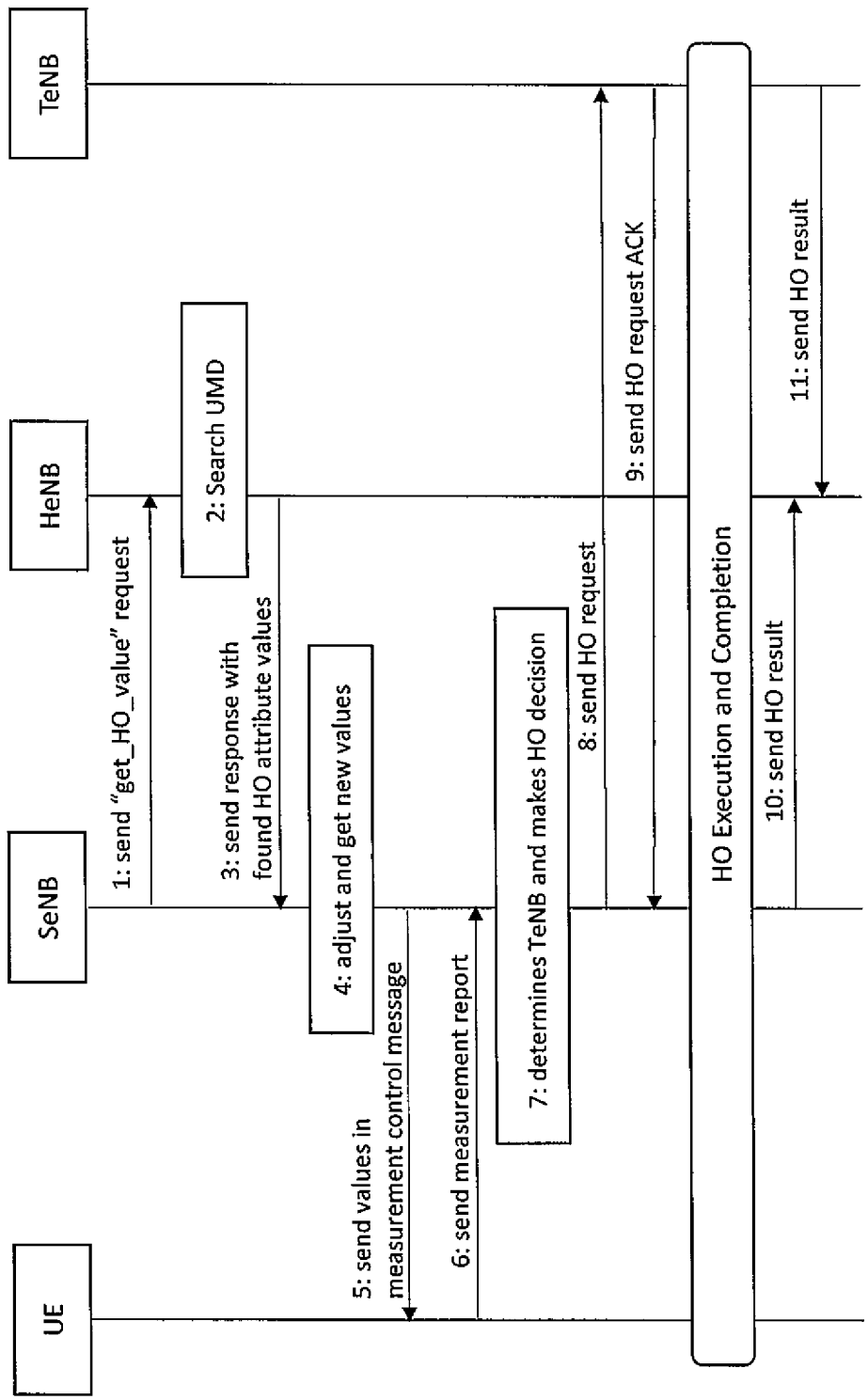
FIG. 4 illustrates an example of a signaling involved in a HO process based on an example of a UMAA-MRO.

Compared to a standard HO process, in at least an example embodiment, (at least) two messages for SeNB to get optimum parameters from the function module are added (cf. messages 1 & 3 in FIG. 4), and (at least) two messages with HO results are sent to the function module of the HeNB for updating a corresponding graph are added (cf. messages 10 & 11 in FIG. 4).

The UMAA-MRO algorithm, through analyzing user mobility data and some further factors/quantities (cf. above), provides a precise way to find and configure appropriate handover parameters for UE on user route level, which can significantly reduce handover failures and avoid unnecessary handovers, and therefore improves overall system performance and user's experience. It is an assistive function to handover in self-optimization OAM system, all adjusted parameters are kept in the range defined by operators and related standards The algorithm is based on analyzing data of user mobility characteristics. It is implemented as a control unit (e.g. in hardware) or a function module (e.g. in software) (or a mixture thereof) in self-optimization OAM system, and can be implemented in eNodeB or MME, or other network elements, which is determined by the organization method of user mobility database.

Note that an eNB in the sense of examples of embodiments of the invention may in one instance be a host eNB, HeNB, for a terminal's data, which keeps the UMD, while at another instance, it is a serving eNB, SeNB, currently serving a terminal for communication, while at another instance, it is a target eNB, TeNB, that will subsequently be serving a terminal for communication after a handover of the terminal UE has been effected to the target eNB. Note further that in some cases e.g. a HeNB may at the same instance be also a SeNB or a TeNB. Whether an eNB acts as HeNB and/or SeNB or TeNB may also depend on a terminal's (user's) mobility pattern.

User Mobility Database

Figure 1:
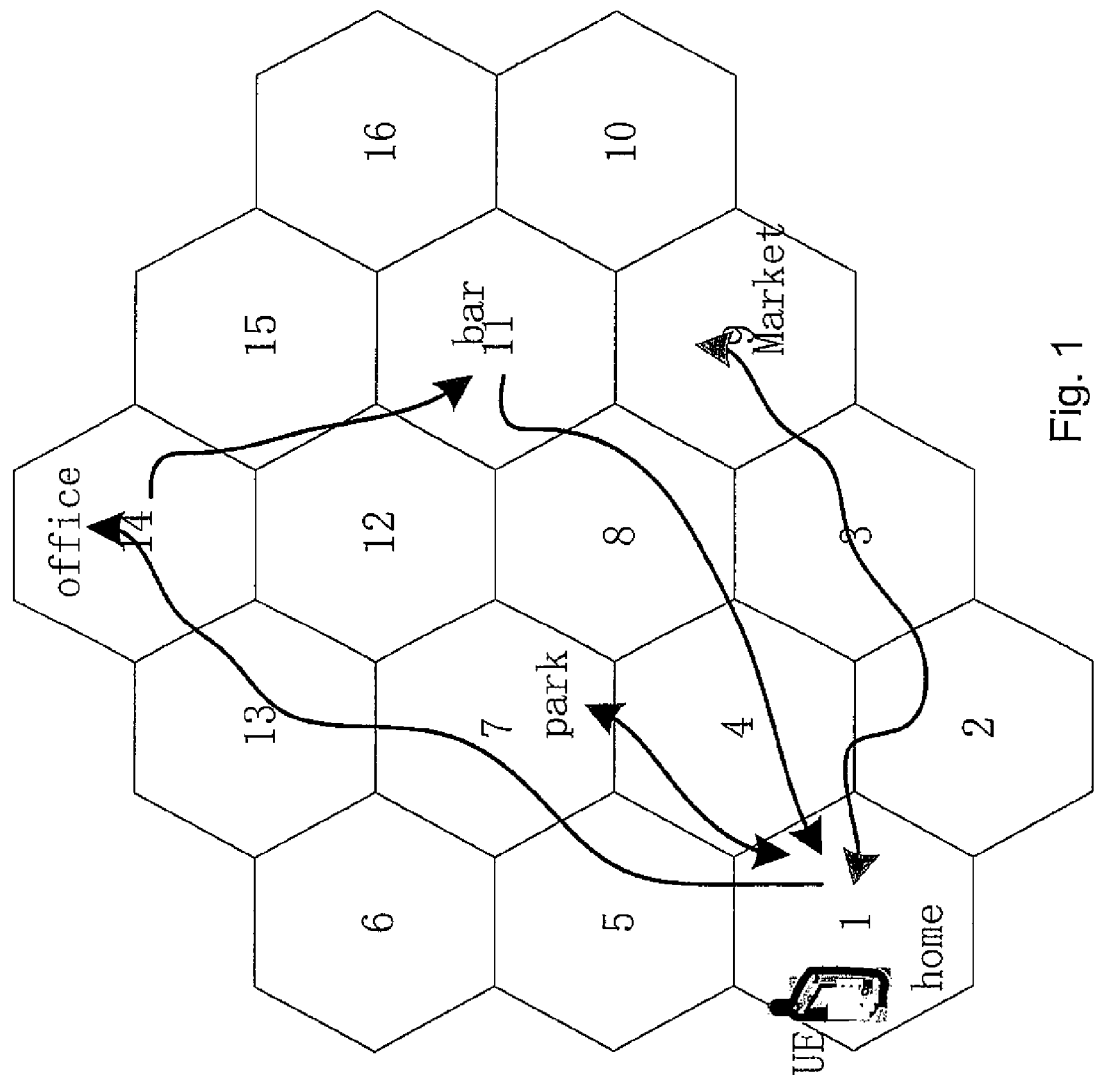
FIG. 1 illustrates an example of a user route pattern.

Most people do the same things in the same period time of most days, so their mobility routes are almost same in the days. As shown in FIG. 1, through recording user mobility info, we can easy get route patterns of the respective user. In at least examples o the present invention, the route pattern is composed by orderly cell IDs, e.g. if a user goes to office from home, the route pattern (in FIG. 1) is 1,5,7,13,14 (expressed in cell IDs, for example; though other representation of the route pattern can be used, e.g. in terms of absolute (e.g. GPS or other navigation system based) or relative (e.g. expressed with reference to a defined location) coordinates.

Further, as shown in FIG. 1, e.g. a route from the office to a bar is 14,15, 12, 11 expressed in cell IDs. A route from the bar to the home is 11, 8, 4, 1. A route from the home to a park and back is 1, 4, 7, 4, 1. A route from the home to a market or shop and back is e.g. 1, 4, 2, 3, 9, 3, 2, 4, 1.

In a route, there may be some handovers for a UE. If we determine the route pattern for a respective user, the appropriate parameters can be configured for the UE.

Data Structure of User Mobility

Figure 2:
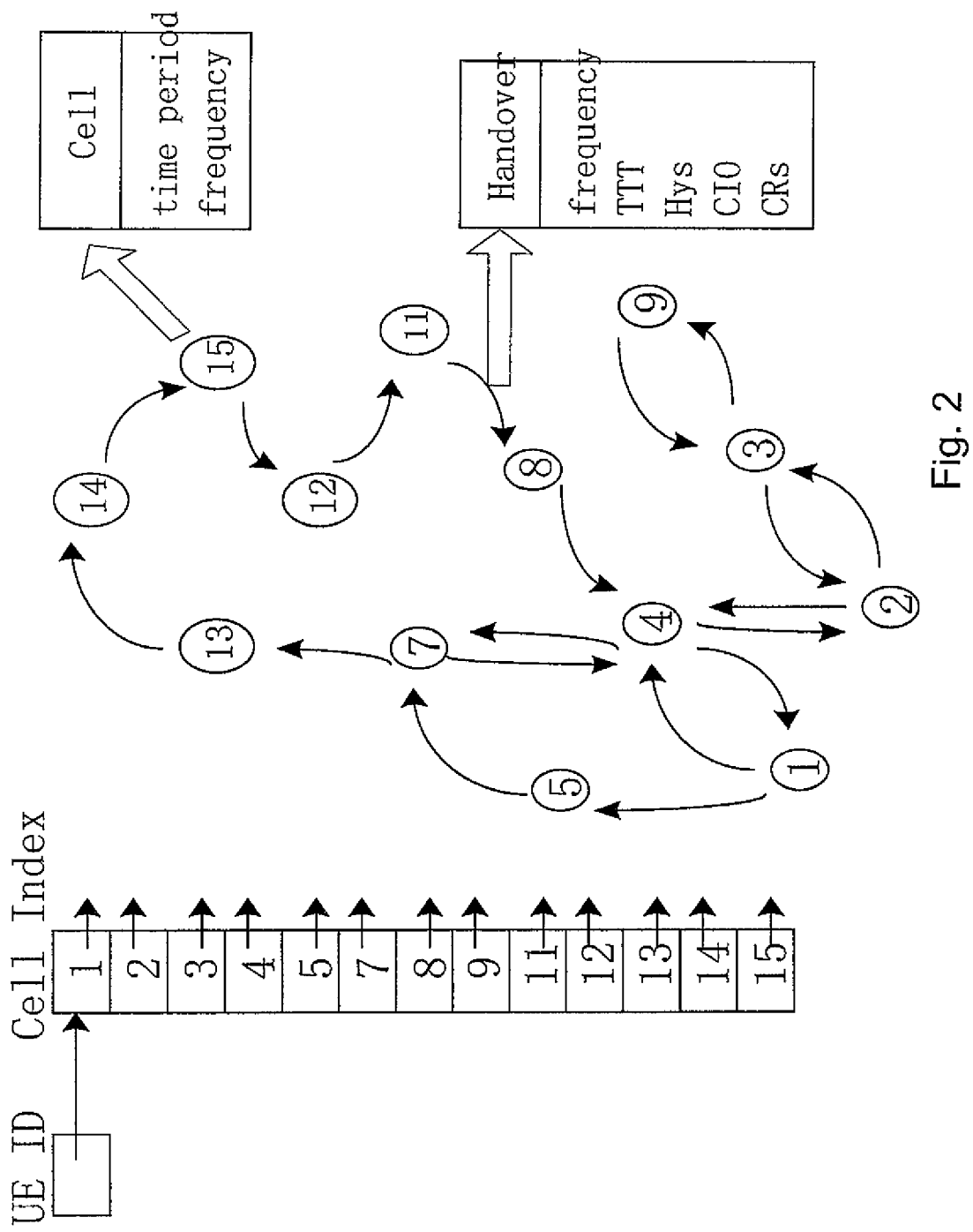
FIG. 2 illustrates an example of a user mobility data structure, based on e.g. such a pattern, and a graph resulting therefrom.

FIG. 2 shows the data structure as e.g. applied in an example implementation of the user mobility database UMD, as well as a graph resulting from a user's/terminal's mobility pattern (route) in the network. As each cell in FIG. 1 has maximum 6 neighbors, maximum 6 edges are defined in a resulting graph and storage space needs to be prepared for those. Thus, for each cell index in FIG. 2, subsections or partitions pertaining to respective edges/transitions are present as storage locations for corresponding data (attributes). E.g. the transition in the graph from node/cell 11 to 8 illustrates the handover parameters/attributes stored in relation to such an edge. Stated in other words, those data are stored for each such transition/edge illustrated as an arrow in the figure. Note further that the data entries for each transition/handover or edge may differ depending on the direction of transition, i.e. different HO parameters may be stored for transition 3->9 compared to the transition 9->3 (when traveling to/from the "market").

Namely, as shown, if we use cell IDs as vertices (or nodes) and handovers (transitions from cell to cell) as edges, the route patterns and handovers for a user construct a directed graph. For vertices, we add statistical information of visits frequency and time periods (of visits); for edges, we use HO frequency as weight and HO parameters as other attributes. The values of attributes are adaptive, and are kept updated according to HO results. In order to speed up the search, we setup indexes using UE ID and cell ID in the User Mobility Database (UMD). The UE ID can be IMEI (international mobile equipment identifier) or IMSI (international mobile subscriber identifier), or any other identity for a user and/or the terminal.

Other Factors for HO Parameters

There are also some factors that will impact HO success rate, and according to example embodiments, are considered in parameters setting. The LTE™ specification recommends e.g. to classify UE speeds into three groups: high (h), medium (m), and normal (n), and to apply proper TTT values to the groups. And the speed factor will also impact Hys parameter setting.

Weather and user habit are examples of other two factors that will mainly impact Hys and CIO parameters setting, e.g. rain fading, habit of using mobile internet.

For each factor, we use some experience values as minor adjustments for HO parameters.

For example, we can also apply categories for UE speed and classify the UE speed into three groups, and for each group (h, m, n) use experience value t (e.g th, tm, tn) and h (hh, hm, hn) as minor adjustments for TTT and Hys. So the adjusted TTT value $T_s$ and Hys value $H_s$ can be gotten as follows:

$$T_s = T - t,$$

with t being one of th, tm, tn depending on the speed of UE, $$H_s = H - h$$

with h being one of hh, hm, hn depending on the speed of UE.

Similar corrections may be applied to one or more of the other parameters CIO, CRs, or the like, depending on speed and/or weather and/or user habit (e.g. user habit can be expressed as static or non static, or the like). Categories can be two, three or more dependent on the parameter.

Limitation and Update

The user mobility data should be limited to a reasonable size because of computing power, latency and storage capacity limitation. A threshold is used to restrict the number of recorded cells of each user. If the number exceeds the threshold, the minimum frequency and/or oldest unvisited cell will be deleted from the graph. Some classical aging algorithms can be used for the purpose.

E.g. if a user visits e.g. a client in a cell 15 (not shown) and goes to restaurant with him in a cell 16 (not shown) more or less frequently in a certain time period, he may not have the time to go to the market in that time period. Hence, in such situation, data entries related to cell 9 (and/or optionally also 2 and 3) may be removed from the records of the UMD due to low frequency of visits and/or age of most recent visit.

The attributes of cell and handover will be updated after each HO. In order to avoid some unnecessary HOs, some very short time visited records will not be recorded.

An example of the processing (or algorithm) is introduced below.

Storage and Distribution

The organization of UMD can be distributed, central, or hybrid, and the storage point can be eNodeB, MME, or other network elements, which will be determined by real use environments. For example, if eNodeBs have enough capacity and strong computing power, and X2 interfaces (connecting eNBs) are of sufficiently high bandwidth enabling proper data transfer and very fast data transfer, we can use distributed UMD. Each eNodeB maintains part of users' mobility data. The data selection rule can be visit time (point of time or duration of time) or visit frequency. Cell (represented by its eNB) can e.g. choose those user data for storage at that eNB (then the hosting eNB, HeNB) that has long visit time in night, this means the user's home is likely in the cell; or long visit time in day, this means the user's work place is likely in the cell. There are also some other allocation methods, e.g. according to UE ID to distribute users' data, or subscription profiles of user, or the like.

In the following parts, we will assume that the UMD is a distributed database deployed in eNodeBs, and the algorithm is implemented in eNodeBs, although it can also be done by other network elements.

HO Parameter Optimization Function

In e.g. 3GPP TS 32.522 and TS 32.521, the HO Parameter Optimization requirements, targets, methods, function modules and architecture are defined. We will follow/reference some of those definitions and terminology to simplify matters and e.g. keep the specification at reasonable volume, which are summarized as follows. HO Parameter Optimization Function shall focus on detecting the problem scenarios described in TS 32.521 section 6.1.3. It includes monitor function and policy control function. The SON based optimization algorithm is located in eNodeB. In event capture and analysis, the eNodeB exploits event information associated with a UE context, such as evidence of previous handovers (UE History, see TS 36.423) and HO failure details (such as in which cell the handover failed and where the UE re-established the connection).

UE measurements are sent within UE measurement reports and they may indicate whether HOs are too early or too late. HO-related performance measurements (PMs) collected at the source and/or target eNodeB can be useful in detecting HO related issues.

Compared to cell-level based HO parameters setting defined in the standards, in at least example of the invention, we use the more precise user-level based method. The cell-level HO parameters values can be set as default values for initializing handover attributes or configuring UE if no related info in UMD.

Process Flow (Algorithm) Description

We will describe the process flow (algorithm) from the following three parts: how to update cell attribute value and cell items in UMD; how to update HO parameters in UMD; and how to select appropriate HO parameters for UE in different scenarios, and what the configuration procedure is.

Cell Info Update

A user's mobility info is maintained by his/her Host eNodeB (HeNB). As described in a preceding section, the cells often visited by the user will be recorded. There are two attributes for cell: time period and visited frequency. We use start time $C_{ts}$ and end time $C_{te}$ to represent the time period, and $C_f$ to represent visited frequency, and $H_f$ to represent HO frequency.

In order to filter and avoid very short time HOs, we use $t_{th}$ as threshold. The cell number threshold is represented as $CN_{th}$.

When a HO is completed for a user, the Source eNodeB (SeNB) and Target eNodeB (TeNB) will send messages to the user's HeNB. (See messages 10 and 11 in FIG. 4)

Figure 3:
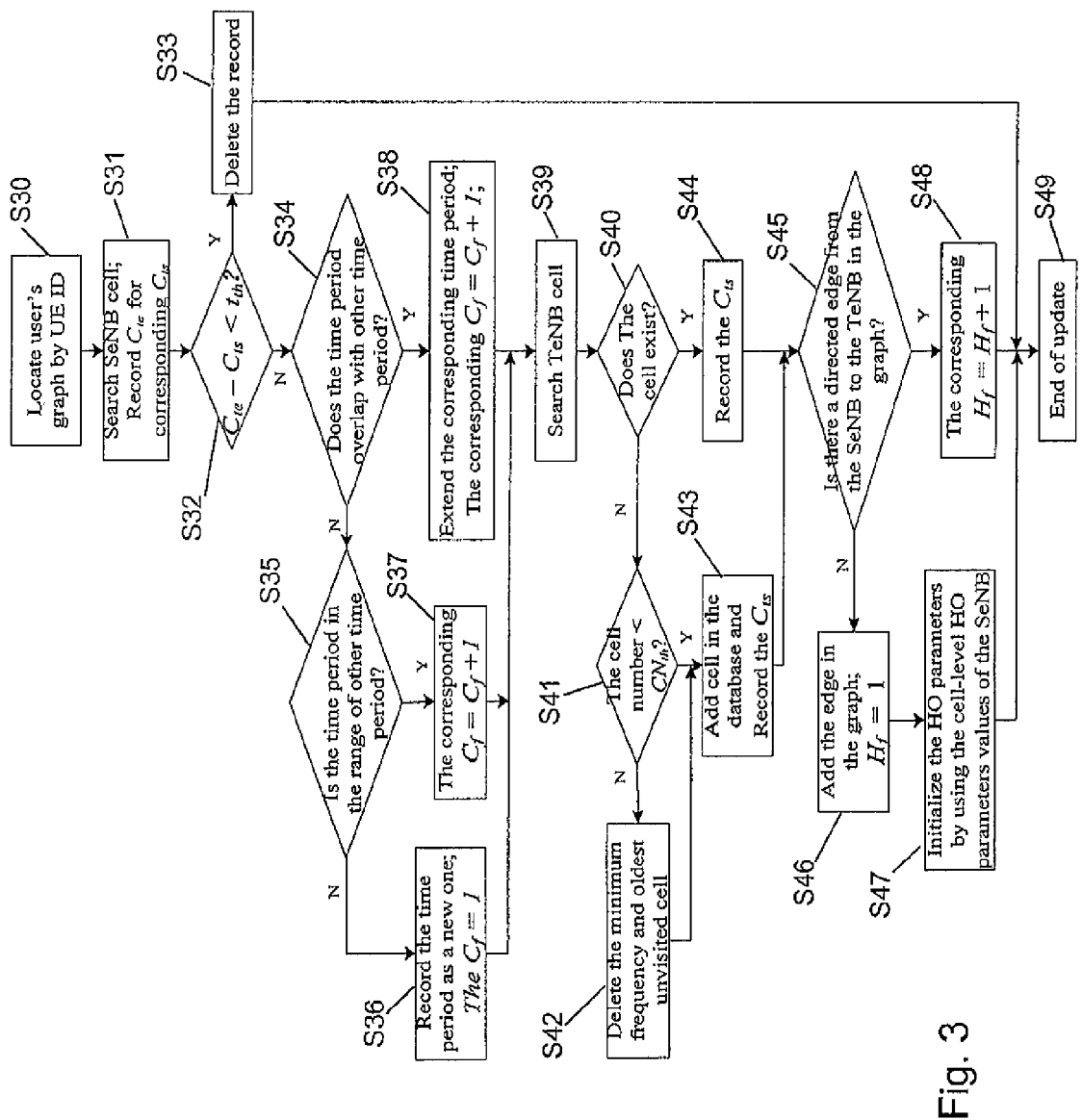
FIG. 3 illustrates a graph update procedure.

Having received these messages, the HeNB will do the following procedure (e.g. in a processing stage "12" not shown as such in FIG. 4), which is explained as an example with reference to FIG. 3.

The procedure starts in a step S30 in which the user's graph is located by UE ID. Then, in step S31, the SeNB cell is searched and $C_{te}$ is recorded for corresponding $C_{ts}$. In step S32 it is checked whether $C_{te}$ minus $C_{ts}$ is smaller than $t_{th}$. If yes, the flow proceeds to S33 where the record is deleted. Thereafter, the update ends (step S49). On the other hand, if $C_{te}$ minus $C_{ts}$ not smaller than $t_{th}$ (NO in S32), the flow proceeds to step S34. In steps S34 it has to be checked whether the time period overlaps with other time period. If this is the case (YES in step S34), the flow proceeds to step S38 where the corresponding time period is extended ($C_f=C_f+1$). On the other hand, if the time period does not overlap with other time period, the flow proceeds to step S35. In step S35 it has to be checked whether the time period is in the range of other time period. If so (YES in step S35), the flow proceeds to step S37 where the corresponding $C_f$ is $C_f+1$. If not (NO in step S35), the flow proceeds to step S36 where the time period is recorded as a new one (the $C_f=1$). Then, whether from step S38, step S36 or step S37, the procedure advances to step S39 where the TeNB cell is searched. Then, in step S40 it is checked whether the cell exists. If so (YES in step S40), the procedure continues with step S44 where the $C_{ts}$ is recorded. If not (NO in step S40), it has to be checked in step S41 whether the cell number is smaller than $CN_{th}$. If it is found that the cell number is smaller than $CN_{th}$, the procedure continues with step S43. On the other hand, if the cell number is not smaller than $CN_{th}$, the procedure continues with step S42 where the minimum frequency and oldest unvisited cell are deleted. Thereafter, the flow proceeds to step S43. In step S43, the cell is added in the database and the $C_{ts}$ is recorded. Then, whether from step S44 or from step S43, the procedure advances to step S45. At this stage, it is checked whether there is a directed edge from the SeNB to the TeNB in the graph. If this is correct (YES in step S45), the flow proceeds to step S48 where the corresponding $H_f$ is $H_f+1$. If not (NO in step S45), the flow proceeds to step S46 where the edge is added in the graph ($H_r=1$). Then, the procedure continues with step S47 where the HO parameters are initialized by using the cell-level HO parameter values of the SeNB. Then, whether from step S48 or from step S47, the procedure advances to step S49 where the update ends.

Hence, as described, through the procedure, some unnecessary cells and corresponding edges will be deleted from the graph, and the routes of user mobility characteristics are retained.

Handover Parameters Update

The HO parameters use cell-level HO parameters values as initial values. As described in the above section, if a HO is a new edge in the graph, the edge attributes will be set by using the initial values. These values will be updated after HeNB receives RLF report from SeNB or TeNB.

The RLF is caused by too early HO or too late HO. The scenarios are described e.g. in TS 32.521. As to how to detect RLF and determine failure type, there are many standardized MRO detection mechanisms and algorithms, and it is out of the scope of the invention.

As to how to update the attributes values, there are many algorithms for cell-level adjustment, which can also be used in the user-route based update.

But considering accuracy, an example of a proper way is the following: for each attribute, we set a single-step minor adjustment value, and the value can be derived from experiences. After receiving RLF report, HeNB will do single-step adjustment according to failure type. For example, if $t_{ss}$ is the adjustment value for attribute TTT, and the RLF failure type is too early HO, the adjusted value for TTT is:

$$T_{ss}=T+t_{ss}$$

On the other hand, if $t_{ss}$ is the adjustment value for attribute TTT, and the RLF failure type is too late HO, the adjusted value for TTT is for example $$T_{ss}=T-t_{ss}$$

(or, when adhering to the formula above, $t_{ss}$ assumes a negative value).

Similar adjustments can be made for one or more other handover parameter such as hys, CIO, etc.

So after several times, the appropriate values for the respective attributes will gradually be found.

Policy and Configuration Procedure

When a UE successfully completes handover to a (target) eNodeB, and the messages for updating the graph have been sent to the HeNB, the (former target) eNodeB will thereafter work as serving eNB, SeNB, to prepare for the next HO. It gets the optimal HO parameters values from HeNB, and configures resulting values to UE through measurement control messages; the UE then generates a measurement report and sends it to SeNB. According to the report and the information from the HeNB, the SeNB will determine TeNB and make a subsequent HO decision.

The whole process is as shown for example in FIG. 4.

The entities involved are presented in horizontal direction like the signaling between those entities. Processing performed by a respective entity is illustrated as a box in vertical direction. Signaling messages and processing by a respective entity is labeled by numerals 1 to 11, to which numerals hereinafter reference is made.

In 1), the SeNB sends a "get_HO_value" request to the HeNB.

In 2), the HeNB searches the UMD (memory and its partitions) according to the UE ID and cell ID to find most possible HO according to time period, frequency and route pattern match.

In 3), the HeNB sends the response with the found HO attributes values to the SeNB.

In 4), the SeNB adjusts and gets the new values according to other impact factors.

In 5), the SeNB sends the values to UE in measurement control message.

In 6), the UE generates measurement report and sends it to SeNB.

In 7), according to the report and the values from HeNB, the SeNB determines TeNB and makes a HO decision.

In 8), the SeNB sends a Handover Request to TeNB.

In 9), the TeNB sends a Handover Request Ack to SeNB.

In 10), after HO execution and completion, the SeNB sends HO result to HeNB.

In 11), the TeNB sends HO result to HeNB.

In 12) (not shown), as mentioned earlier, the HeNB performs the HO parameter update processing as e.g. shown in FIG. 3 for the entries of the UMD memory.

Figure 5:
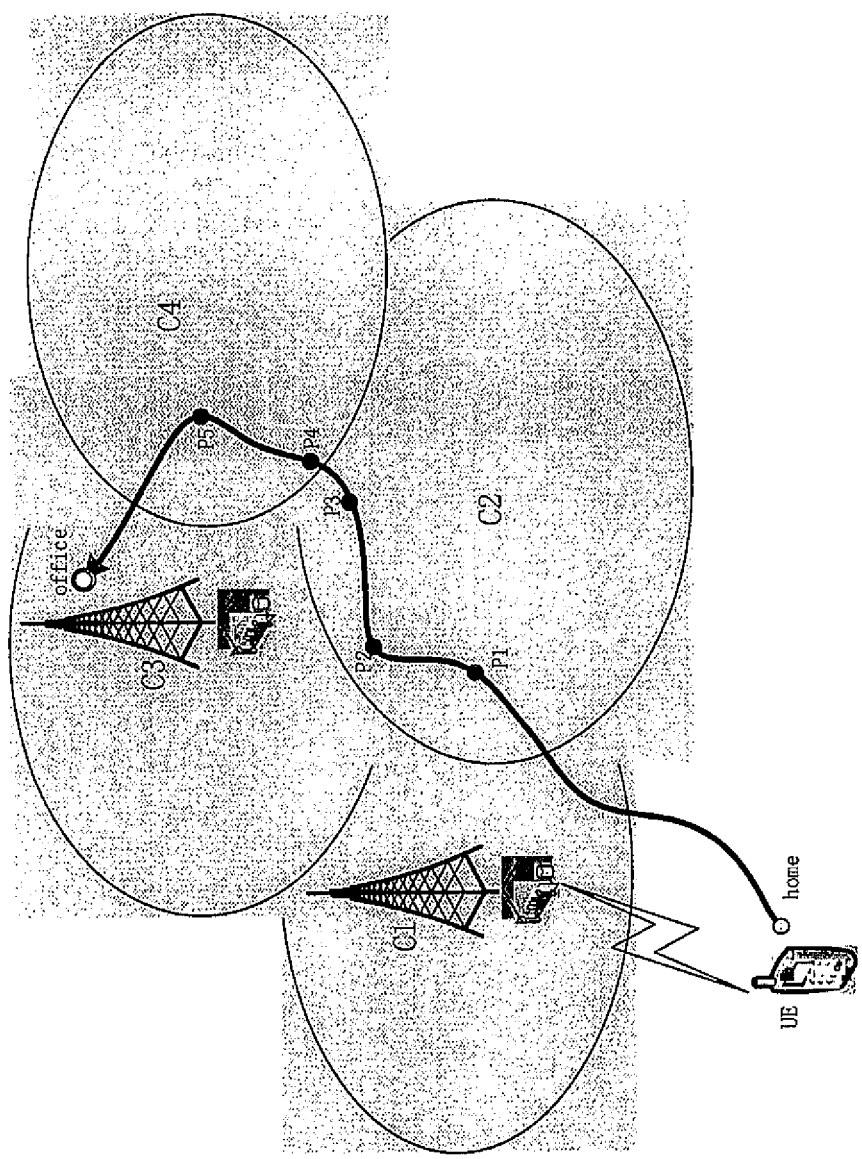
FIG. 5 illustrates an example of a HO scenario.

FIG. 5 illustrates an example of a HO scenario and the effects achieved when one or more aspects of the invention are applied.

As shown in FIG. 5, there are four cells C1 to C4; a user UE goes (from his home) to office (located in C3) in the morning of everyday. The route is as the line in the figure, i.e. for example from home via P1 through P5 to office.

There are five points P1 . . . P5 at which the UE may be subject to handovers. If not considering user mobility characteristics, there may be six or more HOs from home to office, for example, (indicating point Pi and cell Ci allocated) at P1,C1 handover to C2; at P2,C2 handover to C3; at P3,C3 handover to C2; at P4,C2 handover to C3; at P5,C3 handover to C4; and finally, in C4 handover to C3 (prior to arriving at office).

Upon using at least some aspects of the UMAA-MRO algorithm presented herein, through route pattern match in the UMD, C1 will find C3 as a destination in the time period (morning). So it will first choose C3 as TeNB under conditions permitting. The handovers may be: at P2,C1 handover to C3; at P3,C3 handover to C2; at P4,C2 handover to C3, end. So, in the same route to work at office, the number of handovers is reduced to three.

The implementation of the procedure in line with the algorithm will cost some computing power and storage capacity, and compared to standard HO process, it adds four messages (as shown in FIG. 4). But compared to the cost of unnecessary HOs and failure HOs, it is worth to be used. The lives of most people are regular, so their mobile routes are regular. The procedure helps us to find these regularities, to exploit them to reduce HO number in the routes and to provide more precise parameters for users. Through analyzing users mobility data, inventors investigations and experiments revealed that at least 20% HOs can be omitted and 10% HO failures can be avoided.

In the process, we use a threshold to limit the cell number in a user's graph, and use an index to speed up the search. There are two main procedures: update user mobility graph, search optimal solution in the graph. For both of them, the time complexity is O(1). The space complexity is O(n), n is number of users. For each user, there is a directed graph of cells (vertices) and HOs (edges) with their attributes. The cell number is limited by $CN_{th}$; the edge number is limited by $CN_{th}$ and cell neighbour number (e.g. it is six in FIG. 1). So the space for a user can be calculated. For example, if we use 100 bytes for one cell info storage, and 100 bytes for one edge info storage; if the $CN_{th}$=40, and the neighbour number is six, so the graph size for a user is about 40×100+40×6× 100≈28 Kbytes; for a city of 1 million people, considering indexes, the UMD storage space is about 30 G bytes. The $CN_{th}$ should be selected according to real environments, which will improve the algorithm performance.

Figure 6:
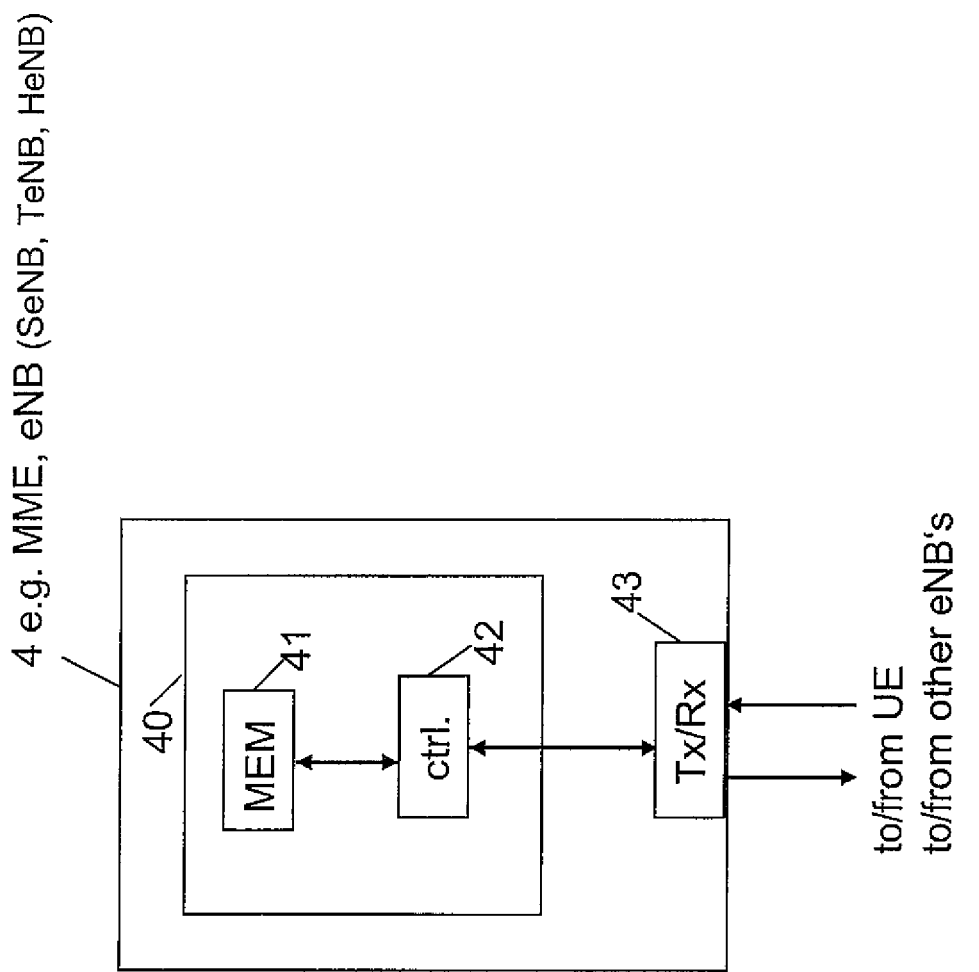
FIG. 6 illustrates an example of a basic block circuit diagram of a network entity such as a eNB or MME.

FIG. 6 shows a basic block circuit diagram of a network entity such as a eNB or MME, in which embodiments of the present invention are implemented. Thus, the entity 4 can be a HeNB, a SeNB or a TeNB, and may also unite HeNB/SeNB or HeNB/TeNB properties/functionalities in some scenarios.

The eNB/MME, denoted by numeral 4, comprises a interface, Tx/Rx, cf. numeral 43, for transmission to/reception from another network entity e.g. another eNB and/or a UE. The interface is bidirectional connected to a control module or unit such as a processor, e.g. a digital signal processor, DSP, or ASIC (ASIC=application specific integrated circuit), CPU (central processing unit), or the like, denoted by numeral 42. The control module or unit (aka controller) is bidirectional connected to a memory module or unit (aka memory) MEM, denoted by numeral 41. The memory module can be any type of memory to which data can be written and from which data can be read, e.g. a Flash memory, RAM (Random Access Memory), or also EPROM (Electrically Programmable Read Only Memory). The memory module is configured to store at least data necessary for implementation of the invention, e.g. control code, acquired and/or processed data to be used for implementing/realizing at least aspects of the invention, and in this regard in particular the UMD or parts thereof in case of a distributed UMD architecture.

Thus, the memory module can be a separate memory module or a partition of a memory module storing also other user/control data handled by the eNB/MME. Other memory modules may be present, too, in the entity. Examples of the invention can be embodied in an apparatus or unit of the eNB/MME, e.g. denoted by numeral 40, comprising at least the modules 42 and 41 above.

Insofar, as described herein above and as derivable there from, the present invention, according to at least some aspects thereof, encompasses:

in terms of e.g. a HeNB and/or UMD, an apparatus, comprising a memory unit; and a control unit connected to the memory unit and configured to interface at least one other apparatus, wherein the memory unit comprises a plurality of partitions, each assigned to a respective terminal, each partition comprising a first plurality of subpartitions of a first type, each assigned to a respective cell visited by the respective terminal, and a second plurality of subpartitions of a second type, each assigned to a respective transition of a terminal between respective cells, and wherein the control unit is configured to receive, upon each transition of a respective terminal between respective cells, data pertaining to the respective terminal from at least one network entity representing a respective cell, and responsive thereto, to store, in each subpartition of the first type, statistical information pertaining to the terminal in relation to that cell; and to store, in each subpartition of the second type, information pertaining to the respective transition of the terminal;

while further subaspects thereof involve that the statistical information stored in each subpartition of the first type comprises at least one of time period of a visit of that cell by the terminal and frequency of visits in that cell by the terminal;

the information pertaining to the respective transition of the terminal stored in each subpartition of the second type comprises at least one of a frequency of handover transitions of the terminal, and one or more handover parameters of time to trigger, hysteresis, cell individual offset, cell reselection;

the control unit is configured to modify, upon each transition of a respective terminal between respective cells, at least one of the data received for being stored and the data already stored in each subpartition of the second type, based on quantities affecting communication;

the quantities affecting communication are one or more of a terminal speed, weather conditions, a terminal's user's habits;

the control unit is configured to receive a report from another apparatus indicative of a failure type of a transition of a terminal, and responsive thereto, update information stored in each subpartition of the second type based on the reported failure type;

the control unit is configured to add a new subpartition of the first type responsive to a detection that a cell is visited by the respective terminal for the first time;

the first plurality of subpartitions of a first type is limited to a first number, and the control unit is configured to detect that the plurality of subpartitions of the first type has reached the first number, and remove a subpartition prior to adding a new subpartition;

the control unit is configured to decide on the subpartition of the first type to be removed by selecting the subpartition of the first type which stores data for a cell based on at least one of the following criteria: a minimum frequency of visits in the cell and oldest unvisited cell;

the control unit is configured to receive a query, from a network entity serving a terminal, for data pertaining to that terminal, and responsive thereto, to send a response including the data stored in the subpartition of the second type for that terminal;

and in terms of e.g. an SeNB, an apparatus, comprising a control unit, configured to request from a network entity hosting data for a terminal, data pertaining to that terminal, receive a response including data stored for that terminal at the network entity; and decide on a transition for that terminal towards another apparatus based on the data received in that response and data received from the terminal;

while a further subaspect thereof involves that the control unit is further configured to report a result of the decided transition towards the another apparatus to the network entity hosting data for the terminal for which the transition was decided;

and in terms of a TeNB, an apparatus, comprising a control unit, configured to receive a request for a transition of a terminal to be subjected to communication control by the apparatus, and report a result of the accomplished transition towards the apparatus to a network entity hosting data for the terminal for which the transition was decided.

Note that embodiments of the present invention may be implemented in software, hardware, application logic or a combination of software, hardware and application logic. The software, application logic and/or hardware generally resides on a module or unit, or chipset or apparatus associated to a device, i.e. mounted/inserted or mountable/insertable to or configured as a part of such a device, such as a network entity like an MSS or similar functionality.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

If desired, the different functions discussed herein may be performed in a different order and/or concurrently with each other. Furthermore, if desired, one or more of the above-described functions may be optional or may be combined.

Although the above description focused on an algorithm aspect, it is to be understood that the algorithm is configurable to corresponding hardware or implemented as software code loaded to a processor.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes apparatuses enabling to improve handovers in mobile communication networks, and for example, an apparatus, comprising a memory unit; and a control unit connected to the memory unit and configured to interface at least one other apparatus, wherein the memory unit comprises a plurality of partitions, each assigned to a respective terminal, each partition comprising a first plurality of subpartitions of a first type, each assigned to a respective cell visited by the respective terminal, and a second plurality of subpartitions of a second type, each assigned to a respective transition of a terminal between respective cells, and wherein the control unit is configured to receive, upon each transition of a respective terminal between respective cells, data pertaining to the respective terminal from at least one network entity representing a respective cell, and responsive thereto, to store, in each subpartition of the first type, statistical information pertaining to the terminal in relation to that cell; and to store, in each subpartition of the second type, information pertaining to the respective transition of the terminal. It also encompasses related apparatuses as well as respective related methods, and computer program products.

LIST OF SOME ACRONYMS AND ABBREVIATIONS AS USED HEREIN ABOVE

SON Self Organization Network
TTT Time to Trigger
MRO Mobility Robustness Optimization
RACH Random Access Channel
HO handover
RRM Radio Resource Management
UMAA-MRO User Mobility Analysis Assistive MRO
CIO Cell Individual Offset
CRs Cell Reselection Parameters
UE User Equipment
RLF Radio Link Failure
UMD User Mobility Database
HeNB Host eNodeB
SeNB Source eNodeB
TeNB Target eNodeB

What is claimed is:

1. An apparatus, comprising:
   one or more processors;
   one or more non-transitory memories comprising a plurality of partitions, each assigned to a respective terminal, each partition comprising:
      a first plurality of subpartitions of a first type, each assigned to a respective cell visited by the respective terminal, and
      a second plurality of subpartitions of a second type, each assigned to a respective transition of a terminal between respective cells, and
   the one or more non-transitory memories further comprising computer program code, wherein the one or more memories and the computer program code are configured to, with the one or more processors, cause the apparatus at least to:
      receive, upon each transition of a respective terminal between respective cells, data pertaining to the respective terminal from at least one network entity representing a respective cell,
      and responsive thereto,
      store, in each subpartition of the first type, statistical information pertaining to the terminal in relation to that cell; and
      store, in each subpartition of the second type, information pertaining to the respective transition of the terminal, wherein the information pertaining to the respective transition of the terminal comprises at least one of: a frequency of handover transitions of the terminal, and one or more handover parameters of time to trigger, hysteresis, cell individual offset, cell reselection,
      modify, upon each transition of a respective terminal between respective cells, at least one of: the data received for being stored and the data already stored in each subpartition of the second type, based on quantities affecting communication.

2. An apparatus according to claim 1, wherein the statistical information stored in each subpartition of the first type comprises at least one of time period of a visit of that cell by the terminal and frequency of visits in that cell by the terminal.

3. An apparatus according to claim 1, wherein the quantities affecting communication are at least one of: a terminal speed, weather conditions, and a terminal's user's habits.

4. An apparatus according to claim 1, wherein the one or more memories and the computer program code are configured to, with the one or more processors, cause the apparatus at least to:
   receive a report from another apparatus indicative of a failure type of a transition of a terminal, and responsive thereto,
   update information stored in each subpartition of the second type based on the reported failure type.

5. An apparatus according to claim 1, wherein the one or more memories and the computer program code are configured to, with the one or more processors, cause the apparatus at least to:
   add a new subpartition of the first type responsive to a detection that a cell is visited by the respective terminal for the first time.

6. An apparatus according to claim 5, wherein the first plurality of subpartitions of a first type is limited to a first number, and wherein the one or more memories and the computer program code are configured to, with the one or more processors, cause the apparatus at least to:
   detect that the plurality of subpartitions of the first type has reached the first number, and
   remove a subpartition prior to adding a new subpartition.

7. An apparatus according to claim 6, wherein the one or more memories and the computer program code are configured to, with the one or more processors, cause the apparatus at least to:
   decide on the subpartition of the first type to be removed by selecting the subpartition of the first type which stores data for a cell based on at least one of the following criteria: a minimum frequency of visits in the cell and oldest unvisited cell.

8. An apparatus according to claim 1, wherein the one or more memories and the computer program code are configured to, with the one or more processors, cause the apparatus at least to:
receive a query, from a network entity serving a terminal, for data pertaining to that terminal, and
responsive thereto,
send a response including the data stored in the subpartition of the second type for that terminal.

9. A method, comprising
providing one or memories with
    a plurality of partitions, each assigned to a respective terminal, each partition comprising
        a first plurality of subpartitions of a first type, each assigned to a respective cell visited by the respective terminal, and
        a second plurality of subpartitions of a second type, each assigned to a respective transition of a terminal between respective cells, and
wherein the method further comprises
    receiving, upon each transition of a respective terminal between respective cells, data pertaining to the respective terminal from at least one network entity representing a respective cell,
    and responsive thereto,
    storing, in each subpartition of the first type, statistical information pertaining to the terminal in relation to that cell; and
    storing, in each subpartition of the second type, information pertaining to the respective transition of the terminal, wherein the information pertaining to the respective transition of the terminal comprises at least one of: a frequency of handover transitions of the terminal, and one or more handover parameters of time to trigger, hysteresis, cell individual offset, cell reselection, and
    modifying, upon each transition of a respective terminal between respective cells, at least one of: the data received for being stored and the data already stored in each subpartition of the second type, a based on quantities affecting communication.

10. A method according to claim 9, wherein
the statistical information stored in each subpartition of the first type comprises at least one of: time period of a visit of that cell by the terminal and frequency of visits in that cell by the terminal.

11. A method according to claim 9, wherein the quantities affecting communication are at least one of: a terminal speed, weather conditions, and a terminal's user's habits.

12. A method according to claim 9, further comprising:
receiving a report from another apparatus indicative of a failure type of a transition of a terminal, and responsive thereto,
updating information stored in each subpartition of the second type based on the reported failure type.

13. A method according to claim 9, further comprising
adding a new subpartition of the first type responsive to a detection that a cell is visited by the respective terminal for the first time.

14. A method according to claim 13, wherein the first plurality of subpartitions of a first type is limited to a first number, and wherein the method further comprises:
detecting that the plurality of subpartitions of the first type has reached the first number, and removing a subpartition prior to adding a new subpartition.

15. A method according to claim 14, further comprising:
deciding on the subpartition of the first type to be removed by selecting the subpartition of the first type which stores data for a cell based on at least one of the following criteria: a minimum frequency of visits in the cell and oldest unvisited cell.

16. A method according to claim 9, further comprising:
receiving a query, from a network entity serving a terminal, for data pertaining to that terminal, and
responsive thereto,
sending a response including the data stored in the subpartition of the second type for that terminal.

17. A computer program product comprising a non-transitory computer readable medium including computer program code which, when executed on a computer, causes the computer to perform at least the following method:
providing one or memories with
    a plurality of partitions, each assigned to a respective terminal, each partition comprising
        a first plurality of subpartitions of a first type, each assigned to a respective cell visited by the respective terminal, and
        a second plurality of subpartitions of a second type, each assigned to a respective transition of a terminal between respective cells, and
wherein the method further comprises
    receiving, upon each transition of a respective terminal between respective cells, data pertaining to the respective terminal from at least one network entity representing a respective cell,
    and responsive thereto,
    storing, in each subpartition of the first type, statistical information pertaining to the terminal in relation to that cell; and
    storing, in each subpartition of the second type, information pertaining to the respective transition of the terminal, wherein the information pertaining to the respective transition of the terminal comprises at least one of a frequency of handover transitions of the terminal, and one or more handover parameters of time to trigger, hysteresis, cell individual offset, cell reselection, and
    modifying, upon each transition of a respective terminal between respective cells, at least one of: the data received for being stored and the data already stored in each subpartition of the second type, based on quantities affecting communication.

18. An apparatus, comprising:
one or more processors;
one or more non-transitory memories comprising a plurality of partitions, each assigned to a respective terminal, each partition comprising:
    a first plurality of subpartitions of a first type, each assigned to a respective cell visited by the respective terminal, wherein the first plurality of subpartitions of the first type is limited to a first number, and
    a second plurality of subpartitions of a second type, each assigned to a respective transition of a terminal between respective cells, and
the one or more non-transitory memories further comprising computer program code, wherein the one or more memories and the computer program code are configured to, with the one or more processors, cause the apparatus at least to:

receive, upon each transition of a respective terminal between respective cells, data pertaining to the respective terminal from at least one network entity representing a respective cell, and responsive thereto, store, in each subpartition of the first type, statistical information pertaining to the terminal in relation to that cell; and store, in each subpartition of the second type, information pertaining to the respective transition of the terminal, detect that the plurality of subpartitions of the first type has reached the first number, remove a subpartition prior to adding a new subpartition, and add the new subpartition of the first type responsive to a detection that a cell is visited by the respective terminal for the first time.

19. An apparatus, comprising:

one or more processors;

one or more non-transitory memories comprising a plurality of partitions, each assigned to a respective terminal, each partition comprising:

a first plurality of subpartitions of a first type, each assigned to a respective cell visited by the respective terminal, and a second plurality of subpartitions of a second type, each assigned to a respective transition of a terminal between respective cells, and the one or more non-transitory memories further comprising computer program code, wherein the one or more memories and the computer program code are configured to, with the one or more processors, cause the apparatus at least to:

receive, upon each transition of a respective terminal between respective cells, data pertaining to the respective terminal from at least one network entity representing a respective cell, and responsive thereto, store, in each subpartition of the first type, statistical information pertaining to the terminal in relation to that cell; and store, in each subpartition of the second type, information pertaining to the respective transition of the terminal, receive a query, from a network entity serving a terminal, for data pertaining to that terminal, and responsive thereto, send a response including the data stored in the subpartition of the second type for that terminal.

20. A method, comprising providing one or memories with a plurality of partitions, each assigned to a respective terminal, each partition comprising a first plurality of subpartitions of a first type, each assigned to a respective cell visited by the respective terminal, and a second plurality of subpartitions of a second type, each assigned to a respective transition of a terminal between respective cells, and wherein the method further comprises receiving, upon each transition of a respective terminal between respective cells, data pertaining to the respective terminal from at least one network entity representing a respective cell, and responsive thereto, storing, in each subpartition of the first type, statistical information pertaining to the terminal in relation to that cell; and storing, in each subpartition of the second type, information pertaining to the respective transition of the terminal, detecting that the plurality of subpartitions of the first type has reached the first number, removing a subpartition prior to adding a new subpartition, and adding the new subpartition of the first type responsive to a detection that a cell is visited by the respective terminal for the first time.

* * * * *